May 23, 1961   J. C. DANLY ET AL   2,984,880
READILY RELEASABLE CLAMPING ASSEMBLY
Filed Jan. 16, 1957   3 Sheets-Sheet 1

INVENTORS
JAMES C. DANLY
JOHN R. DANLY
VASIL GEORGEFF
ROBERT E. KRAUSS
ATTORNEY

United States Patent Office 2,984,880
Patented May 23, 1961

2,984,880

READILY RELEASABLE CLAMPING ASSEMBLY

James C. Danly, River Forest, John R. Danly, Hinsdale, Vasil Georgeff, La Grange Park, and Robert E. Krauss, Western Springs, Ill., assignors to Danly Machine Specialties, Inc., Chicago, Ill., a corporation of Illinois Filed Jan. 16, 1957, Ser. No. 634,449

9 Claims. (Cl. 24—81)

Our invention relates to a readily releasable clamping assembly and more particularly to an improved readily releasable clamping assembly which securely attaches a pair of members together to withstand heavy shock loads while permitting the attached parts to be readily released from each other.

It is often necessary that a member be attached securely to a frame with sufficient pressure to withstand heavy shock loads while at the same time being readily removable from the frame. Examples of such instances are where a respective punch adapter plate or blank holder ring is to be attached to the inner slide or blank holder slide of a power press. In the prior art in order that the plate or ring be secured with sufficient force to withstand the extreme pressures incident to the stripping action of the press and the normal drawing operation of the press bolts are employed as securing means. Readily releasable securing means known in the prior art do not afford sufficient pressure for the power press uses described above and other similar uses. The bolts employed as a securing means in the prior art obviously do not permit a ready removal of a part from the frame or the like to which it is secured.

We have invented an improved readily releasable clamping assembly which permits a pair of parts to be secured to connect the parts with a pressure sufficient to withstand heavy forces while permitting the parts to be readily disassembled. The construction of our assembly is extremely simple. Our clamping means is simple and dependable in operation.

One object of our invention is to provide a readily releasable clamping assembly for securing a pair of parts with sufficient pressure to withstand extreme forces.

The object of our invention is to provide a readily releasable clamping assembly which is simple in construction and in operation.

A further object of our invention is to provide a readily releasable clamping assembly which is dependable and certain in operation.

Other and further objects of our invention will appear from the following description.

In general our invention contemplates the provision of a readily releasable clamping assembly including a clamping arm pivotally carried by an eccentric formed on a shaft rotatably supported on a frame or the like to which a member such as a blankholder ring or a die holder plate is to be secured. A spring normally positions our clamping arm to permit a latching head carried by the arm to engage the member. We provide a spring for rotating the shaft to position the eccentric to move the clamping arm to draw the member against the frame through the medium of the latching head. A piston and cylinder assembly may be actuated alternately to augment the spring action to increase the clamping pressure or to act against the spring to release the clamping pressure. Our assembly also has interengaging means for moving the arm to a position where the latching head is clear of the blankholder ring or the like after the clamping pressure has been relieved.

In the accompanying drawings which form part of the instant specification and which are to be read in conjunction therewith and in which like reference numbers are used to indicate like parts in the various views.

Figure 1:
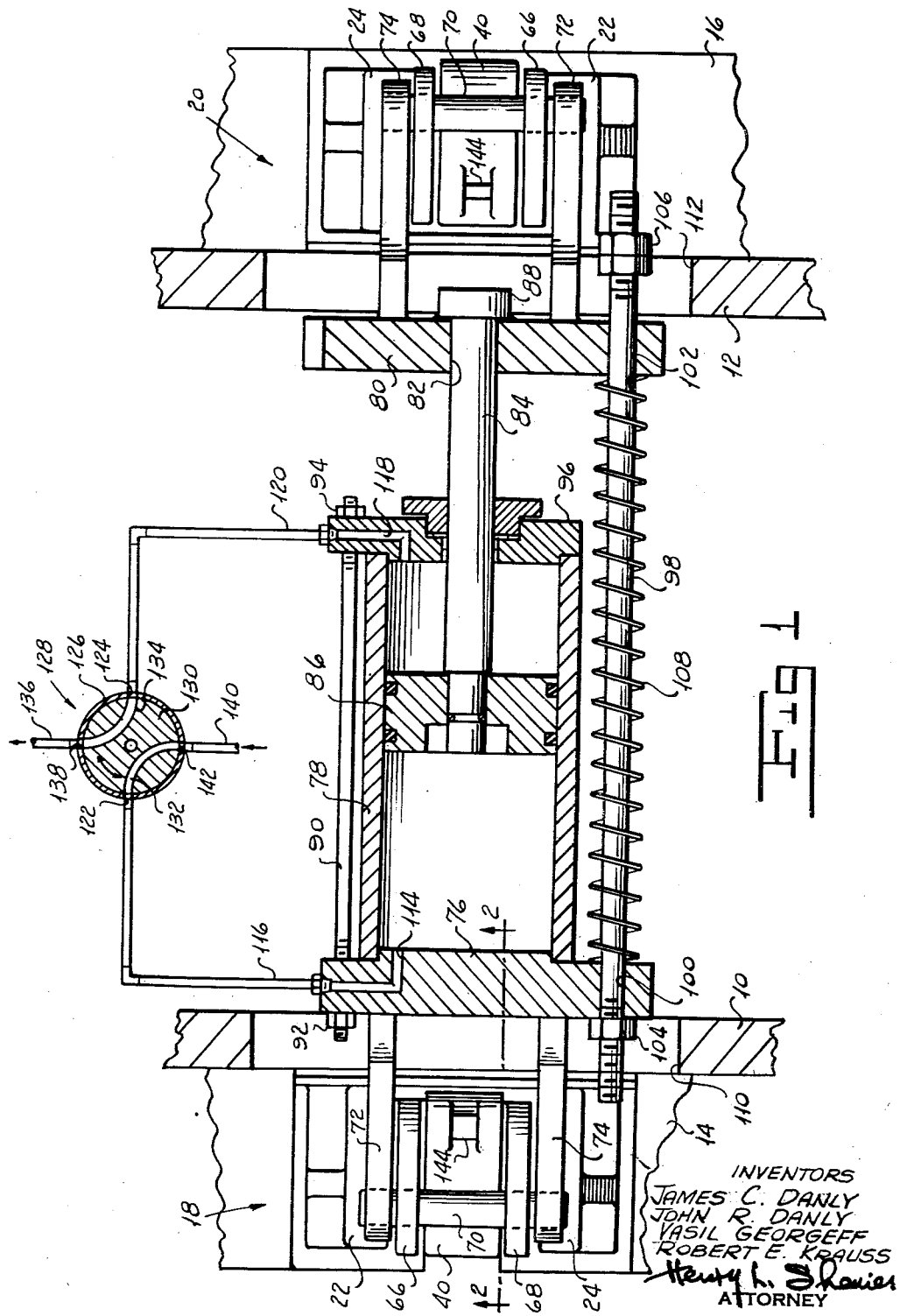
Figure 1 is a sectional view of one form of our improved readily releasable clamping assembly.

More particularly referring now to the drawings we have shown a form of our readily releasable clamping assembly used on a power press inner slide having a front wall 10 and a rear wall 12 provided with respective flanges 14 and 16. The flanges 14 and 16 carry respective clamping arm assemblies indicated generally respectively by the reference characters 18 and 20.

Since the assemblies 18 and 20 are identical for purposes of simplicity only the assembly 18 will be described in detail. We mount respective spaced shaft supports 22 and 24 on flange 14. Bushings 26 and 28 disposed in bores 30 and 32 on the respective supports 22 and 24 rotatably carry a shaft 34. We form the center portion of shaft 34 between supports 22 and 24 with an eccentric 36 which carries a bushing 38, which rotatably supports the clamping arm 40 of assembly 18. We form the lower end of arm 40 as viewed in Figures 2 and 3 with a head 42 adapted to engage the underside of a slotted boss 44 formed in a recess 46 in the punch adapter plate 48 or the like to be secured to the press slide.

Figure 2:
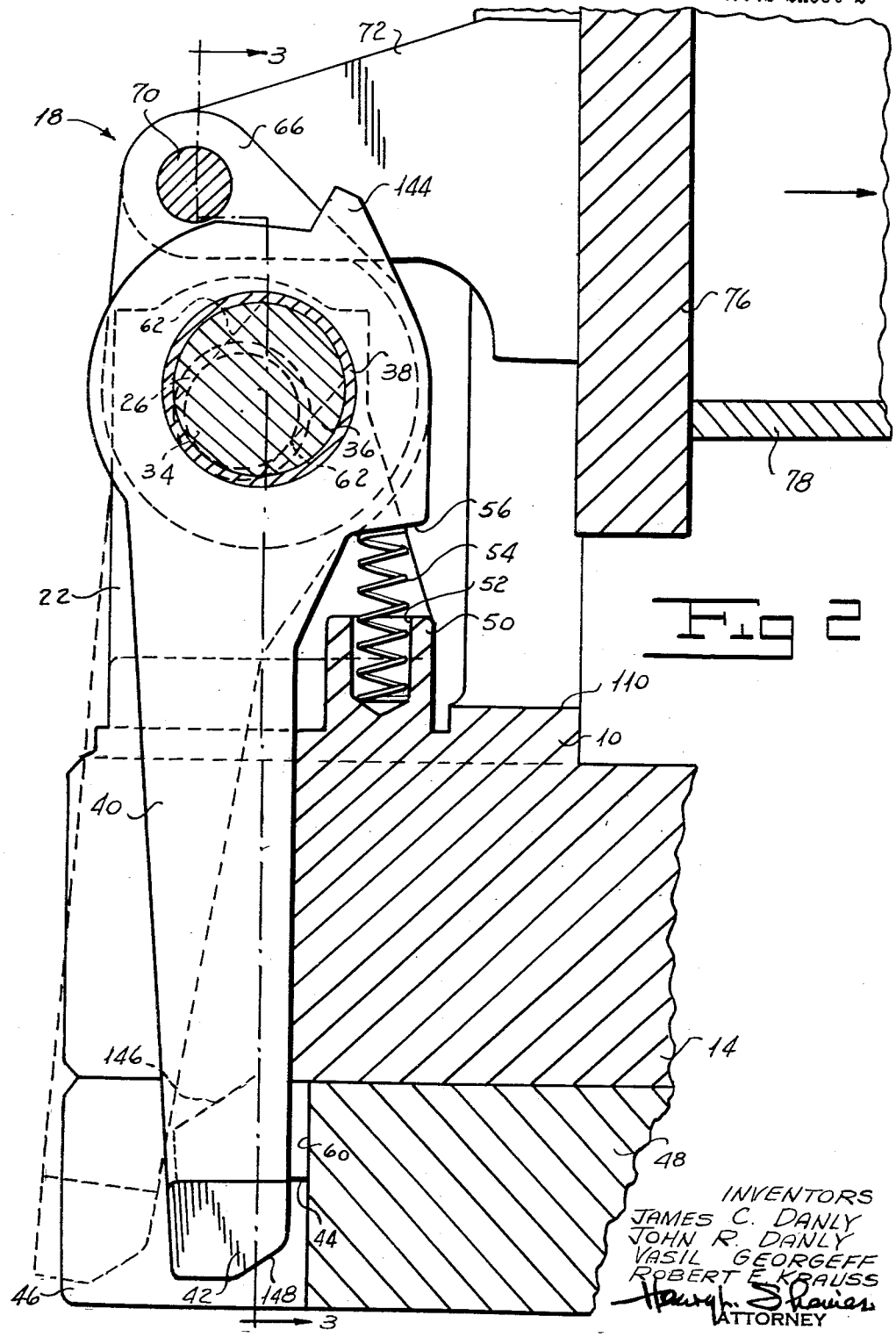
Figure 2 is a sectional view of our improved readily releasable clamping assembly taken along the line 2—2 of Figure 1 and drawn on an enlarged scale.
Figure 3:
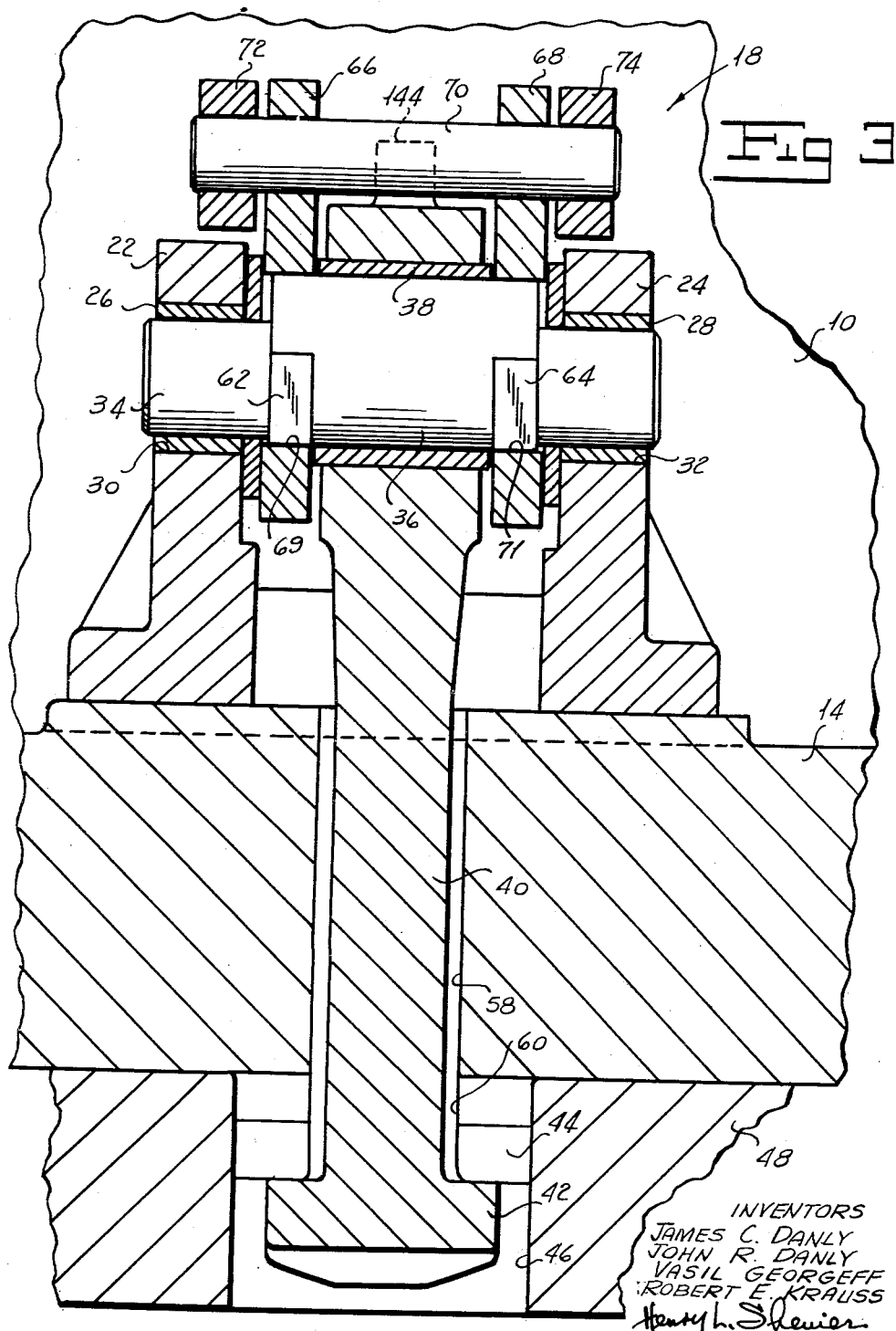
Figure 3 is a sectional view of our readily releasable clamping assembly taken along line 3—3 of Figure 2.

As can be seen by reference to Figure 2 a boss 50 formed on flange 14 has a vertical bore 52 in which we dispose a coil spring 54. Spring 54 bears between the base of bore 52 and a boss 56 formed on arm 40. Under the action of spring 54 arm 40 normally occupies a position in which its head 42 is adapted to engage the underside of the boss 44 in recess 46. In this position of the arm 40 its shank passes through a slot 60 formed in the boss 44.

We provide the assembly 18 with means for rotating eccentric 36 to position the eccentric axis above or below the axis of shaft 34 respectively to draw the arm 40 upwardly to clamp plate 48 between head 42 and flange 14 or to release the clamping pressure. The eccentric 36 has respective flat portions 62 and 64 for receiving a pair of respective cranks 66 and 68 having openings 69 and 71 complementary to the flat eccentric portions 62 and 64. It will be appreciated that as cranks 66 and 68 are driven shaft 34 rotates.

The cranks 66 and 68 of each assembly 18 and 20 rotatably carry a clevis pin 70. The ends of each pin 70 outboard of cranks 66 and 68 carry respective clevis arms 72 and 74. Referring now to Figure 1 we secure the clevis arms 72 and 74 of assembly 18 by welding or the like to plate 76 which closes one end of a cylinder 78. We secure the arms 72 and 74 of assembly 20 by means of welding or the like to a base 80 having a bore 82 through which the rod 84 of a piston 86 disposed in the cylinder 78 extends. We secure a head 88 formed on the end of rod 84 remote from head 86 to the base 80 by welding or the like to provide a driving engagement between base 80 and rod 84. A rod 90 carrying nuts 92 and 94 on its respective threaded ends retains plate 76 and a second plate 96 in assembled positions on the ends of cylinder 78. A rod 98 is retained in openings 100 and 102 in plate 76 and in base 80 by nuts 104 and 106 carried by the threaded ends of rod 98. A spring 108 carried by rod 98 bears between plate 76 and base 80 normally to urge the plate and base away from each other. We form openings 110 and 112 in the front 10 and in back 12 to permit passage of the respective pairs of clevis arms of assembly 18 and of assembly 20.

Under the normal action of spring 108 plate 76 and base 80 move away from each other as viewed in Figure 1. As a consequence of this action shaft 34 of assembly 18 rotates in a counterclockwise direction as viewed in Figure 2 to move the axis of eccentric 36 to a position above the axis of shaft 34 to draw arm 40 upwardly to draw plate 48 firmly against the flange 14. At the same time the shaft 34 of assembly 20 rotates to move its arm 40 to draw plate 48 up against flange 16. This clamping pressure supplied by spring 108 is sufficient to support the weight of the punch and punch adapter plate 48.

We provide our assembly with means for supplying the additional clamping pressure required to withstand the stripping action of the press. A passage 114 formed in plate 76 connects a pipe 116 to the interior of cylinder 78 on the left hand side of piston 86 as viewed in Figure 1. A passage 118 formed in plate 96 connects a pipe 120 to the interior of cylinder 78 on the right hand side of piston 86 as viewed in Figure 1. We connect the respective pipes 116 and 120 to openings 122 and 124 formed in the housing 126 of a valve indicated generally by the reference character 128. The rotatable valve body 130 in housing 126 is formed with respective passages 132 and 134. A pipe 136 connects an opening 138 in housing 126 to the atmosphere or to an area of reduced pressure. A pipe 140 connects an opening 142 in housing 126 to a source (not shown) of fluid under pressure. In the position of the valve shown in Figure 1 passage 132 connects the source of fluid under pressure to pipe 116 and passage 134 connects pipe 120 to the atmosphere. In this position of the valve the fluid under pressure supplied to cylinder 78 through pipe 116 augments the pressure of spring 108 to increase the clamping pressure to the degree required to withstand the stripping action of the press.

When plate 48 is to be unclamped from the press slide, valve 128 is actuated to connect pipe 120 to the source of fluid under pressure and to connect pipe 116 to the atmosphere. In this condition of our device the fluid under pressure draws plate 76 and base 80 toward each other against the action of spring 108. When this occurs shaft 34 of assembly 18 is rotated in a clockwise direction as viewed in Figure 2 to position the center of eccentric 36 below the axis of shaft 34 to move arm 40 downwardly to relieve the clamping pressure on plate 48. At the same time the arm 40 of assembly 20 is moved to relieve its pressure on plate 48. We form each of the arms 40 with a projection 144. As the clevis pin 70 of each assembly 18 and 20 moves inwardly under the influence of the respective pairs of clevis arms it engages the projection 144 of the corresponding arm 40. At this time the eccentric 36 has rotated a sufficient distance to relieve the clamping pressure on plate 48. Upon continued movement of the arms 72 and 74 the pins 70 act on projections 144 to move the arms 40 to a position at which their heads 42 are not adapted to engage bosses 44. This position of the arm 40 of assembly 18 is shown in broken lines in Figure 2. I will be appreciated that this movement of arms 40 takes place against the action of springs 54.

As can be seen by referring to Figure 2 each of the bosses 44 is provided with a bevel 146 on its upper surface. Each head 42 has a bevel 148 on its underside. Bevels 146 and 148 cooperate to cam arms 40 outwardly in the event the slide is dropped down on the dies before the clamping mechanism is actuated to its released position.

In the application of our clamping assembly shown in the drawings and described hereinabove, in which a punch adapter plate is to be secured to a press slide, we employ pairs of clamping assemblies actuated by a common piston and cylinder arrangement. It will be understood that as many clamping assemblies as are desired may be used. When a blank holder ring is to be secured to a blank holder it is not feasible to employ a common piston and cylinder for operating pairs of assemblies. In this situation a separate piston and cylinder assembly is employed for each clamping assembly.

In operation of our clamping assembly when for example a punch adapter plate is to be secured to a press slide having flanges 14 and 16, the plate 48 first is moved over the press bed. We actuate valve 128 to connect pipe 120 to the source of fluid under pressure and to connect pipe 116 to the atmosphere. In this condition of the apparatus the fluid under pressure acts on piston 86 and cylinder 78 to move plate 76 and base 80 toward each other as viewed in Figure 1 against the action of spring 108. As the plate and base move toward each other pins 70 move inboard of the assembly to drive shafts 34 to position the centers of eccentrics 36 below the axes of shafts 34. During the initial protion of this movement of shafts 34 arms 40 first move downwardly. When pins 70 engage projections 144 the arms are moved outwardly to positions to clear the bosses 44 on plate 48. With the apparatus in this condition the inner slide is moved down until flanges 14 and 16 rest on plate 48. It will be remembered that if, through inadvertence or for any other reason, arms 40 have not been moved outwardly bevels 146 and 148 cam the arms outwardly as the slide moves toward the plate to prevent damage. When the inner slide has been moved to a position over plate 48 valve 128 is reversed to connect pipe 116 to the source of fluid under pressure and to connect pipe 120 to the atmosphere. With the apparatus in this condition pins 70 are driven outboard of the apparatus to move the centers of the eccentrics 36 to positions over the axes of shaft 34. As soon as pins 70 leave projections 144 springs 54 move arms 40 to position heads 42 under bosses 44. Spring 108 acts with the fluid under pressure to move eccentrics 36 to draw plate 48 up against flanges 14 and 16. As is pointed out herein above spring 108 provides sufficient clamping pressure to support plate 48 and the punch carried thereby. The fluid under pressure provides the additional force required to withstand the stripping action of the press. Spring 108 prevents accidental damage in the event that the source of fluid under pressure fails for any reason.

When it is desired to release plate 48 valve 128 is again reversed to connect pipe 120 to the source of fluid under pressure and to connect pipe 116 to the atmosphere.

It will be seen that we have accomplished the objects of our invention. We have provided a readily releasable clamping assembly which holds two parts together with sufficient force to withstand great shock while permitting the parts to be readily released from each other. Our assembly is simple in construction and certain in operation. Our assembly is safe in that it holds the parts secured in the event of a failure in the source of fluid under pressure.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is not to be limited to the specific details shown and described.

Having thus described our invention, what we claim is:

1. A readily releasable clamping assembly for securing a pair of members in assembled relationship including in combination a pair of respective shafts, respective eccentrics secured to said shafts, means mounting the respective shafts on one of said members, respective clamping arms pivotally carried by said eccentrics, means carried by said arms for engaging the other of said members, means normally urging said shafts to rotate to pivot said eccentrics to move said arms to draw said pair of members together and common means for alternately acting against said shaft urging means and for augmenting the action of the shaft urging means.

2. A readily releasable clamping assembly as in claim 1 in which said shaft urging means includes a spring disposed between said arms to urge said shafts to rotate in opposite directions.

3. A readily releasable clamping assembly as in claim 1 in which said common means comprises a piston and cylinder assembly disposed between said arms and a valve for controlling the action of said assembly.

4. In a power press having a slide and a member to be clamped to said slide, a readily releasable clamping assembly for securing said member to said slide including in combination an eccentric, means mounting said eccentric for rotary movement on said slide, a clamping arm pivotally carried by said eccentric, means carried by said arm for engaging said member, means normally urging said eccentric to a position to draw said member against said slide, means adapted to be actuated alternatively to augment the action of said urging means and to act against said urging means to relieve the clamping pressure of said arm and means for actuating said alternatively actuated means.

5. In a power press having a slide and a member to be clamped to said slide, a readily releasable clamping assembly for securing said member to said slide including in combination an eccentric, means mounting said eccentric for rotary movement on said slide, a clamping arm pivotally carried by said eccentric, means carried by said arm for engaging said member, means normally positioning said arm to permit said engaging means to engage said member, means normally urging said eccentric to a position to draw said member against the slide, means adapted to be actuated alternatively to augment the action of said urging means and to act against said urging means to relieve the clamping pressure of said arm, means for actuating said alternatively actuated means and means responsive to the action of the alternatively actuated means in acting against the shaft urging means for positioning said arm clear of said member.

6. In a power press having a slide and a member to be clamped to the slide, a readily releasable clamping assembly for securing said member to said slide including in combination an eccentric, means mounting said eccentric for rotary movement on said slide, a clamping arm pivotally carried by said eccentric, means carried by said arm for engaging said member, means normally urging said eccentric to a position to draw said member against said slide, means comprising a cylinder and a piston disposed in said cylinder adapted to be actuated alternatively to augment the action of said urging means and to act against said urging means to relieve the clamping pressure of said arm and means comprising a valve for alternatively supplying fluid under pressure to said cylinder on the respective sides of said piston for actuating said alternatively actuated means.

7. In a power press having a slide and a member to be clamped to the slide, a readily releasable clamping assembly for securing said member to the slide including in combination an eccentric, means mounting said eccentric for rotary movement on the slide, a clamping arm pivotally carried by said eccentric, means carried by said arm for engaging said member, means normally urging said arm to a position on said eccentric at which it may engage said member, means normally urging said eccentric to a position to move said clamping arm to draw said member against said slide, means adapted to be actuated alternately to augment the action of said eccentric urging means and to act against said eccentric urging means to relieve the clamping pressure of said arm, and means for actuating said alternately actuated means.

8. In a power press having a slide and a member to be clamped to said slide, a readily releasable clamping assembly for securing said member to said slide including in combination an eccentric, means mounting said eccentric for rotary movement on said slide, a clamping arm pivotally carried by said eccentric, means carried by said arm for engaging said member, means normally urging said eccentric to a position to draw said member against said slide and means for augmenting the action of said eccentric positioning means.

9. A readily releasable clamping assembly for securing a pair of members in assembled relationship including in combination a pair of respective eccentrics, means mounting the eccentrics for rotary movement on one of said members, respective clamping arms pivotally carried by said eccentrics, means carried by said arms for engaging the other of said members, means normally urging said eccentrics to rotate to move said arms to draw said pair of members together and common means for alternatively acting against said eccentric urging means and for augmenting the action of the eccentric urging means.

References Cited in the file of this patent

UNITED STATES PATENTS

| | | |
|---|---|---|
| 486,723 | Loss | Nov. 22, 1892 |
| 1,395,708 | Grode | Nov. 1, 1921 |
| 1,796,748 | Coquille | Mar. 17, 1931 |
| 1,809,566 | Ott | June 9, 1931 |
| 1,839,401 | Lewis | Jan. 5, 1932 |
| 1,846,200 | Harvey | Feb. 23, 1932 |
| 2,154,038 | Evrell | Apr. 11, 1939 |
| 2,378,654 | Pekny | June 19, 1945 |
| 2,516,336 | Olander | June 25, 1950 |
| 2,755,758 | Johansen | July 24, 1956 |

FOREIGN PATENTS

| | | |
|---|---|---|
| 16,650 | Great Britain | Sept. 18, 1900 |
| 473,868 | Great Britain | Oct. 21, 1937 |
| 899,551 | France | Aug. 28, 1944 |